(12) United States Patent
Wynn

(10) Patent No.: US 6,236,212 B1
(45) Date of Patent: May 22, 2001

(54) INDUCED POLARIZATION SYSTEM USING TOWED CABLE CARRYING TRANSMITTERS AND RECEIVERS FOR IDENTIFYING MINERALS ON THE OCEAN FLOOR

(75) Inventor: Jeffrey C. Wynn, Sterling, VA (US)

(73) Assignee: The United States of America as represented by the Secretary of the Interior, Washington, DC (US)

(*) Notice: Subject to any disclaimer, the term of this patent is extended or adjusted under 35 U.S.C. 154(b) by 0 days.

(21) Appl. No.: 09/102,281

(22) Filed: Jun. 22, 1998

(51) Int. Cl.[7] ..................................................... G01V 3/02
(52) U.S. Cl. .......................................... 324/365; 324/357
(58) Field of Search .................................... 324/347, 354, 324/357, 358, 360, 362, 363, 364, 326, 345

(56) References Cited

U.S. PATENT DOCUMENTS

| | | |
|---|---|---|
| 3,984,759 | 10/1976 | St-Amant et al. . |
| 4,041,372 | 8/1977 | Miller et al. . |
| 4,467,642 | 8/1984 | Givens . |
| 5,671,136 | 9/1997 | Willhoit, Jr. . |

OTHER PUBLICATIONS

Jeffrey C. Wynn, "Titanium geophysics: The application of induced polarization to sea–floor mineral exploration"; Geophysics, vol. 53, pp. 386–401, Mar. 1998.*

* cited by examiner

Primary Examiner—Jay Patidar

(57) ABSTRACT

A system is provided for detecting minerals and metal-containing materials which are located in sediment deposits on the sea floor and which exhibit an induced polarization response. A streamer cable, which, in use, is towed in the sea behind a ship, includes a series of transmitters and receivers at the free end thereof. The cable is towed such that the free end is in contact with to the sea floor and the transmitters are used to transmit a square wave electrical current into the sediment there. The receivers are used to detect any secondary signals produced by an induced polarization source located on or beneath the sea floor in response to electrical current. Pre-amplifiers connected to the receivers provide noise rejection. On-board electronics process the secondary signals to determine measurement parameters characteristic of the source thereof so as to identify the source. A computer uses this information, together with simultaneously acquired global position data, to determine the location of the source.

18 Claims, 2 Drawing Sheets

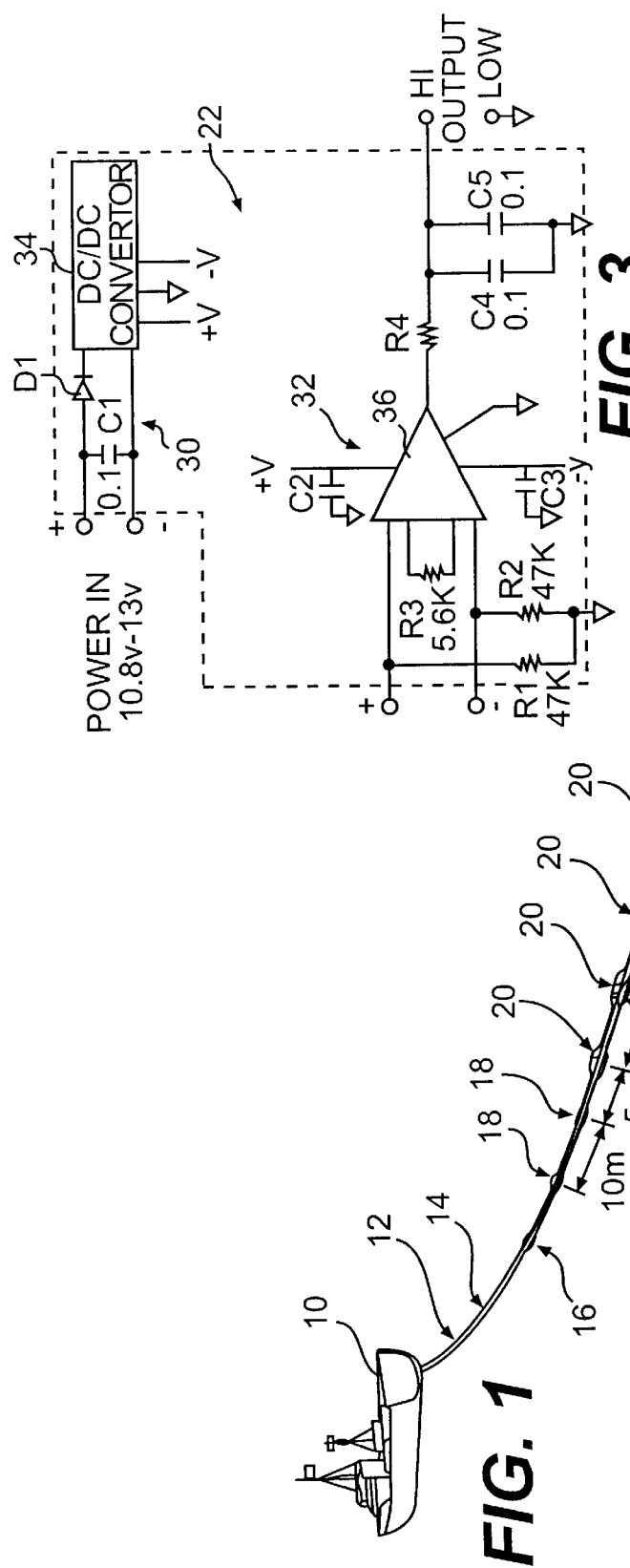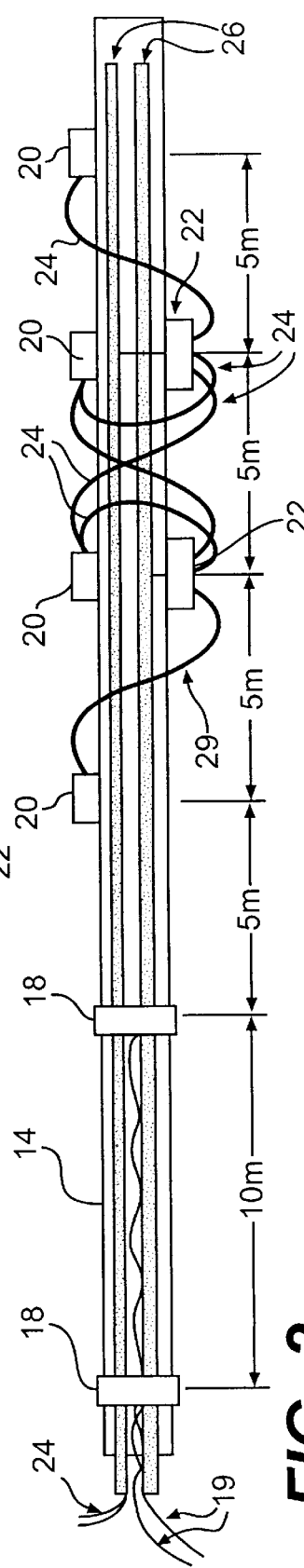

INDUCED POLARIZATION SYSTEM USING TOWED CABLE CARRYING TRANSMITTERS AND RECEIVERS FOR IDENTIFYING MINERALS ON THE OCEAN FLOOR

CROSS REFERENCE TO RELATED APPLICATIONS

This application discloses subject matter in common with U.S. application Ser. No. 09/099,149, which is entitled INDUCED POLARIZATION METHOD FOR IDENTIFYING MINERALS ON THE OCEAN FLOOR, and is filed concurrently herewith, and which is hereby incorporated by reference.

FIELD OF THE INVENTION

The present invention relates to an induced polarization system for detection or identification of metals, metallic minerals and the like in sediment deposits on and beneath the sea floor.

BACKGROUND OF THE INVENTION

As was mentioned above and is discussed in more detail below, the invention concerns an induced polarization (IP) detector. The IP effect is a current-induced electrical response detected as a delayed voltage in certain minerals and, as described below, the method has been used for some time in the detection of these minerals in the ground. One manifestation of the response is that the voltage on an array of detectors or receivers lags the primary or inducing voltage (produced by a transmitter) by a finite amount of time. This is usually expressed as a phase-shift, i.e., a slight shift of the wave-cycle between the transmitter and receiver, and is usually reported in units of milliradians, where one duty cycle of the transmitter is $2\pi$ radians.

For many decades it has been known that pyrite, most other metallic-luster minerals, and certain clays give rise to an IP effect. Geophysicists have taken advantage of this fact to discover and map large disseminated sulfide bodies (primarily copper and molybdenum) since the 1950's. The phenomenon is based on a complex double-layer interaction of ions in the electrolyte (the ground water) and the individual mineral surfaces. Because of this, IP is more sensitive to surface area than to volume and finely disseminated minerals make the best targets. An IP survey typically gathers both resistivity information, which is generally a measure of the porosity of the substrate, and polarization information, which is a measure of the reactivity of certain minerals (i.e., those described above) disseminated throughout the surface. Computer modeling can then be used to arrive at models that best fit the observed data acquired on the surface, with the purpose of providing a true map of the three-dimensional nature of the subsurface. The use of two physical characteristics (resistivity and polarization information) instead of just one makes the interpretation much more reliable.

There are, of course, a number of patents relating to induced polarization detectors for the detection of minerals and other materials, and among these are the following: U.S. Pat. No. 5,671,136 (Willhoit), U.S. Pat. No. 4,467,642 (Givens), U.S. Pat. No. 4,041,372 (Miller, et al.), and U.S. Pat. No. 3,984,759 (St. Amant, et al.). These patents are not concerned with detectors adapted for use in a subsea environment.

It will be appreciated that the use of IP detection in a subsea environment presents tremendous engineering obstacles, including current channeling in the seawater and noise problems because of the low signal-to-noise ratio of the signals involved. Because of these and other obstacles, to the knowledge of applicant, IP detection systems have not used previously in the detection of minerals and the like on the sea floor.

SUMMARY OF THE INVENTION

In accordance with the invention, an induced polarization detection system is provided which enables the detection of minerals and metal-containing materials on or below the sea floor and which does this without the need for implanting electrodes in the sea floor sediments being examined. Because IP detection is sensitive to surface area, rather than volume, the system of the invention enables efficient detection of very small amounts of material well below the sea floor, including, inter alia, titanium minerals and gold and platinum group elements where associated together, metallic particles of manmade origin, and certain other materials and items not detectable by existing magnetic or seismic detectors. As will be apparent, the system of the invention incorporates a number of important features which overcome the serious problems and obstacles encountered in any attempt to use IP in a subsea environment.

According to the invention, a system is provided for use in making induced polarization measurements under the sea, the system comprising: a streamer cable having a proximal end adapted to be towed from a ship in the sea, and a distal end positionable, in use, during towing of the cable, near or on the sea floor, said streamer cable including an active portion located at the distal end and comprising at least one transmitter for injecting a periodic electrical current into the sea floor, at least one receiver for receiving secondary signals produced by induced polarization of sources on or in the sea floor in response to the periodic electrical current, and at least one pre-amplifier connected to said at least one receiver for conditioning the secondary signals so as to combat noise and cross-talk effects in the secondary signals to thereby produce conditioned secondary signals; and on-board means, adapted to be disposed on-board the ship that tows the streamer cable, for supplying electrical current to said at least one transmitter and for receiving and processing said conditioned secondary signals from said at least one preamplifier.

Advantageously, the pre-amplifier comprises a common-mode-rejection three-electrode pre-amplifier. The on-board means preferably includes a signal processor and the pre-amplifier is advantageously connected by a grounded, shielded, co-axial line to the signal processor. Preferably, the system includes a floating ground independent of the signal processor and also of the ship that tows the streamer cable, and the co-axial line is connected to the floating ground. The at least one pre-amplifier is advantageously disposed in close proximity to the at least one receiver.

The at least one transmitter preferably comprises a titanium wire electrode connected by a transmitter cable contained within said streamer cable to the on-board means. As discussed below, the use of a titanium electrode provides important advantages, particularly with respect to combating the corrosive effects of sea water. In an advantageous implementation, first and second titanium wire electrodes are employed.

Preferably, the at least one receiver comprises a silver-silver chloride electrode. The at least one receiver preferably comprises a plurality of receiver electrodes disposed in equally spaced relation along the streamer cable so as to provide, in use, sampling at different depths. The plurality of receiver electrodes advantageously comprises first and second dipole pairs of receiver electrodes. In a beneficial implementation, four receiver electrodes are connected together in groups of three wherein each group includes a shared electrode and a central electrode in forming the first and second dipole pairs.

Preferably, the on-board means comprises a current transmitter circuit connected to said at least one transmitter, and a data processing unit or signal processor connected to said at least one pre-amplifier for processing the conditioned signals, the processing unit being connected to the current transmitter circuit through an optical isolation amplifier to control the output of the current transmitter circuit. The current transmitter circuit preferably transmits a square-wave signal to said at least one transmitter.

In an application wherein the system is particularly adapted for use in detecting ilmenite in a towed mode (i.e., a mode wherein the streamer cable is towed from the ship), the square-wave signal is transmitted at a frequency of 4 Hz since it has been discovered that ilmenite produces its strongest IP response at this frequency.

In an application wherein the system is adapted for use in a stationary "spectral" mode wherein the ship is maintained at selected position, the current transmitter generates square-wave signals at different frequencies to enable a determination to be made of the spectral signature of the source of the IP response.

The signal processor or data processor unit advantageously provides resistivity and phase-shift calculations based on the conditioned signals. In a beneficial implementation, the data processor unit provides these calculations on a one-second continuous sampling basis during the towed mode, i.e., where the streamer cable is towed from the ship.

Preferably, the on-board means further comprises a global positioning device for sampling location, velocity and directional data and storing means for storing said data along with electrical data based on said secondary signals for use in determining the location of the source of the secondary signals. The storing means advantageously comprises a laptop computer and the electrical data preferably comprises resistivity and induced polarization data.

The streamer cable preferably includes a weight for maintaining the active portion of the streamer cable on the sea floor. The weight advantageously comprises a tapered lead torpedo weight. Further, a drogue rope is preferably connected to the streamer cable for stabilizing the streamer cable while being towed on the sea floor.

Other features and advantages of the invention will be set forth in, or apparent from, the following detailed description of preferred embodiments of the invention.

BRIEF DESCRIPTION OF THE DRAWINGS

FIG. 1 is schematic perspective view of a ship towing or dragging a streamer in accordance with the invention;

FIG. 2 is schematic side elevational view, drawn to an enlarged scale, of the active portion of the streamer of FIG. 1;

FIG. 3 is a schematic circuit diagram of one of the pre-amplifiers of FIGS. 1 and 2.

DESCRIPTION OF THE PREFERRED EMBODIMENTS

Figure 4:
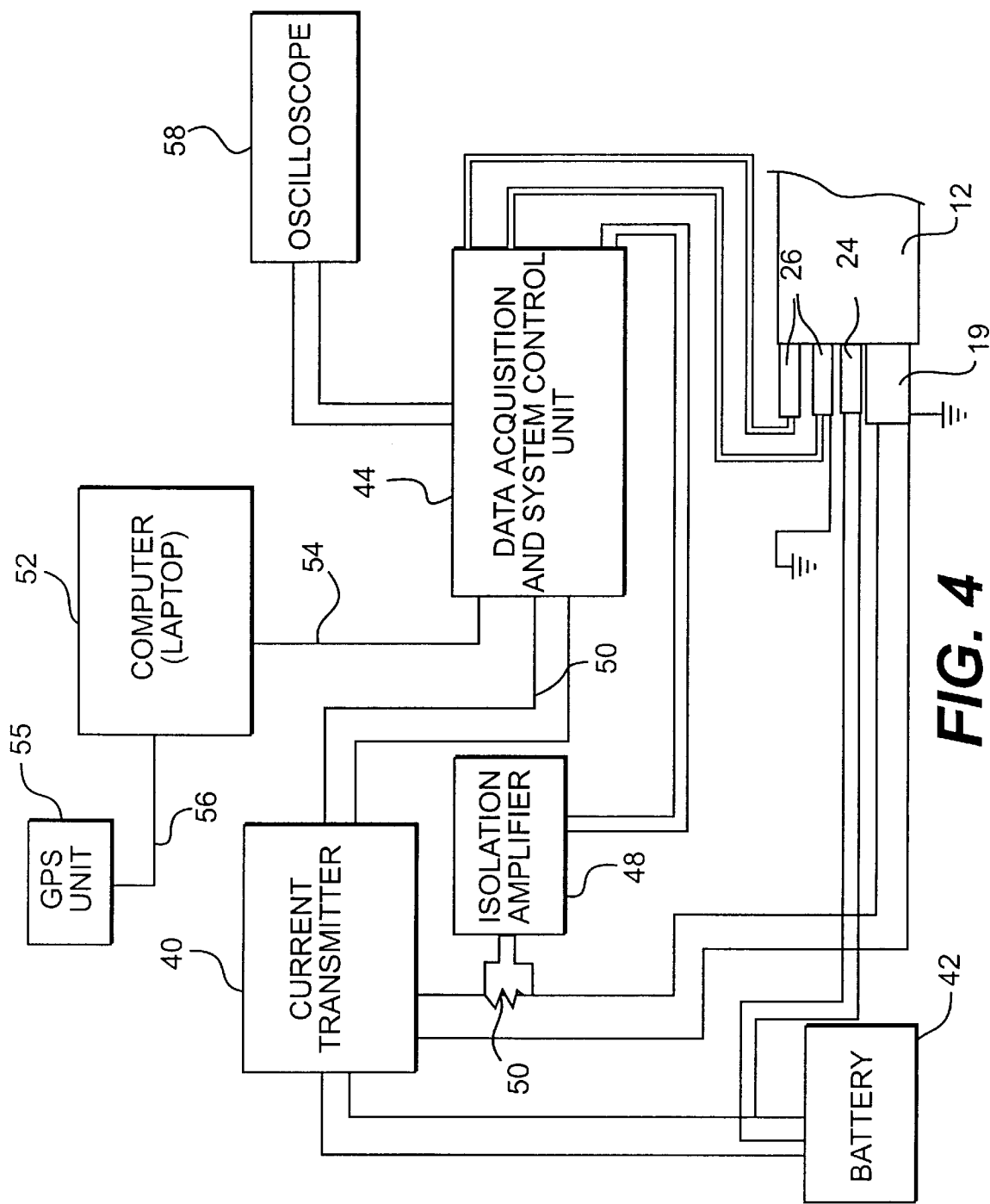
FIG. 4 is block diagram of a preferred embodiment of the on-board electronics of the induced polarization detection system of the invention.

Referring to FIG. 1, there is shown a streamer system incorporating the present invention. A ship, which is indicated at 10 and which can be any ship of a length longer than about 25 feet, is used to tow a streamer 12 including a multi-wire-stranded cable 14. The ship 10 includes an on-board a digital stack and averaging data-acquisition system (now shown) which is described below in connection with FIG. 4. The multi-wire-shielded cable 14 is used to carry a transmitted signal down the cable and to carry an amplified received signal back to the electronics aboard the ship 10, as is further described hereinbelow.

A weight 16 (a 10 kg tapered lead torpedo weight in an exemplary embodiment) is affixed to cable 14 and is used to depress the towed cable 14. In this regard, computer modeling has shown that an insufficient signal penetrates the sediments of the sea floor if the streamer 12 "flies" more than about one meter above these sediments.

Cable 12 also carries a pair of spaced transmitter electrodes 18 which, in the exemplary embodiment under consideration, are spaced about 10 meters apart. Electrodes 18, which are also illustrated in FIG. 2, are preferably made of titanium wire so that the electrodes do not corrode with being used with about 2 to 5 amperes of electrical current. It will be appreciated that seawater is highly corrosive, especially the presence of several amperes of current. Electrodes 18 are used transmit current at low voltages (to suppress noise) and at high amperages. Electrodes 18 take advantage of a non-linear transition at about 15 volts, above which current will cascade from the electrodes 18 into the seawater. Current flow above the 15-volt level is limited only by the cable resistance. Electrodes 18 are connected to the inside of cable 14 in a waterproof manner, e.g., by using waterproof "take-outs" (not shown), so as to prevent seawater from penetrating into the cable under hydrostatic pressure and changing the electrical characteristics of the cable 14 while in use. In this regard, a change in the phase characteristics would make the calibration procedure ineffective and the towed-mode IP phase-values (described below) unreliable. As illustrated in FIG. 2, a shielded twisted pair 19 is used to supply power to transmitters 18. Preferably the shield twisted pair 19 comprises a ground-shielded twisted pair of twenty-two gauge wire designed to provide a square-wave current signal to the titanium electrodes 18 while having minimum cross-talk with the received signal coming back up the streamer 12.

As shown in FIGS. 1 and 2, four receiver electrodes 20 are affixed to cable 14 in equally spaced relationship. In the illustrated embodiment, the first or most proximal of the electrodes 20 is spaced about five meters from the most distal transmitter 18 and the receiver electrodes 20 are themselves spaced apart about five meters. The receiver electrodes 20 are non-polarizable, i.e., do not produce an arbitrary battery effect, when in use, due to corrosion and electrolysis. To this end, in a preferred embodiment, electrodes 20 are composed of silver wire immersed in a stable-base silver-chloride gel which is exposed to contact with the seawater. The electrodes 20 are encased in a heavy plastic sheath (not shown) to provide protection against abrasion and damage from sharp objects while still affording electrical contact with the seawater.

As is also shown in both FIGS. 1 and 2, a pair of common-mode-rejection differential pre-amplifiers 22 are used to remove common-mode noise by providing a reference electrode between the measurement electrodes 20. Twisted-pair wires 24 are used to provide power to the pre-amplifiers 22. Three input wires 24 are connected to each pre-amplifier 22 to implement the common-mode rejection arrangement wherein a reference electrode equidistant between receiver electrodes 20 is used to provide removal of common-mode noise from the received signal. Pre-amplifiers 22 also strengthen and condition the received signal which is returned through shielded coaxial cables 26 to minimize electrode cross-talk wherein the two-ampere transmitted signal would overwhelm and swamp the millivolt-level signals from receivers 20. The pre-amplifiers 22 should be located as close as possible to the receiving electrodes 20 so as to minimize the exposure to noise and should be compact in order to minimize the abrasive cross section presented by the streamer 12.

The array of receivers 20 uses three receiver electrodes per dipole instead of two, with the center electrode serving as a reference for the corresponding common-mode-rejection pre-amplifier 22. Electrodes 20 can be shared by different dipoles at the same time because of the high input impedance of the pre-amplifiers 22. More particularly, first dipole (n=0.5) is formed by the first and third of the first three receivers 20. If normal separation for each dipole is ten meters, the first receiver pair is located at half a dipole spacing from the closest transmitter 18. This spacing effectively allows sampling of sediments to an approximate depth of 2 meters below the sediment-water interface in seawater if the cable 14 is in contact with the seafloor. The second or central electrode 20 in the triple group serves as the reference electrode. A second dipole is formed by the most distal triple group of receivers 20 so that two receivers are shared with the first group. The electrode spacing is ten meters (n=1) and effective sampling of sediments can be carried out down to approximately 5 meters below the sediment-water interface.

Referring again to FIG. 1, a drogue rope 28 is attached to towed cable 14 to stabilize the cable array while underway and to minimize cable whipping and undulation since such would contribute an artificial noise to the received signal.

Referring to FIG. 3, there is shown a schematic circuit diagram of a preferred embodiment of one of the common-mode-rejection differential amplifiers 22. As noted above, the amplifiers 22 are used on the active end of the marine IP streamer 12 to capture and condition the received signal and in the exemplary embodiment illustrated in FIG. 3, the amplifier provides a gain of ten. In the illustrated embodiment, power supply 30 for the pre-amplifier unit 32 includes a DC/DC converter 34 including a shunt capacitor C1 connected between the input leads and diode D1 connected in series with the positive lead, and provides power supply voltages +V and -V for the basic amplifier circuit 36. Amplifier circuit 36 includes positive and negative differential inputs between which shunt resistors R1 and R2 are connected to ground. A further resister R3 is connected as shown. Further capacitors C2 and C3 are respectively connected between the power supply connections +V and -V to ground, and two further capacitors C4 and C5 are connected between the amplifier output connection and ground, and a further resistor R4 is connected in series in this connection, as shown. The input voltage should be near 12 volts, and the input consists of a triple group of a positive, a negative, and a reference electrode (the latter of which is connected to the electrical ground of the preamplifier).

Referring to FIG. 4, there is shown a block diagram of the on-board electronics mentioned above. In FIG. 4, the armored streamer 12 is shown as including a plurality of shielded cables corresponding to those discussed above, viz., shielded coaxial cables or lines 19 which provides current to the transmitter 18, cables or lines 24 which provide power to the pre-amplifiers 22 and cables or lines 26 which carry the received signals. The shielded coaxial lines 19 are grounded and electrically shielded as much as possible to providing shielding from the transmitted signal. The non-ship ground is a sacrificial electrode (typically a copper plate) which is hung overboard so that the ground voltage of the electrical system is allowed to float independently of the electrical system of the ship, thereby reducing or eliminating another source of noise contamination.

Briefly describing the basic units of FIG. 4, as illustrated, cables 19 are connected to a current transmitter 40, cables 24 are connected to a battery 42 which is also connected to current transmitter 40, and cables 26 are connected to a data-acquisition and system control unit 44. The latter is connected through an isolation amplifier 48 to a shunt resister 50 connected in one of the connections to cable 19 and through a logic link 50 to current transmitter 40. A computer 52 (which is preferably a laptop) is connected through a data download connection 54 to the system control unit 44 and to a Global Positioning System (GPS) or a Differential Global Positioning System (DGPS) unit 55 through an input connection or download cable 56. An oscilloscope 58 is also connected to the system control unit 44, to monitor signal quality.

Considering the particular elements or units of FIG. 4 in more detail, the DGPS data stream on the GPS download cable 56 is acquired via a PCMCIA serial-port card by GPS unit 55 which can be any standard NMGA-0183 encoded GPS device. In an exemplary embodiment GPS unit 55 is a Motorola PLGR key-encryption system capable of providing absolute locational precision to better than 20 meters and a NMEA 0183 data stream every two seconds. The GPS or DGPS data system is used to provide precise location information for the active end of the streamer 12 using software integration in the laptop computer 52. Laptop computer 52 acquires processed electrical data (resistivity and chargeability for each of the two different depth channels provided by the first and second receiver dipoles described above) via input connection or download cable 54, as well the GPS data stream from input connection 56, and combines these two data streams in real time, displays the result, i.e., shows the operator what is happening, and stores the data for subsequent use and analysis.

The data acquisition and system control unit 44 is a GDP-32 device which is specialized to provide geophysical data acquisition and processing and is designed to acquire analog data from the IP streamer 12 and to convert these data into digital form. Unit 44 performs a Fourier transform on the converted signals and deconvolves the signals against a calibrate record, acquired before the data acquisition begins, in order to remove extraneous effects due to the cables 26 and unit 44 itself. Unit 44 is programmed, via E-PROMs, to calculate resistivity and chargeability (the latter being a measure of the IP effect) for the two different channels at the same time and to provide the results in a continuous data stream as the streamer 12 is being towed over the ocean floor.

The oscilloscope 58 is used to monitor the received and transmitted signals to verify that there are no ground loops and that no extraneous noise is entering the system.

The current transmitter 40 is a ZT-20 current transmitter which is controlled by unit 44 and is designed to provide a precisely controlled square wave signal to cable 19. Data link 50 is a cable which allows unit 44 to control the timing and amplitude of the square wave signal produced by current transmitter 40.

The isolation amplifier 48 is an isolation optical amplifier which enables the square wave signal from current transmitter 40 to be precisely controlled by means of feedback from the sensing resister 50 to the unit 44. Because the transmitter signal is optically isolated from the received signal, there is no electrical noise, voltage offset, or crosstalk arriving at unit 44 from transmitter 40.

Battery 42 is a 12/24 volt battery which serves as the D.C. power source for current transmitter 40 and also provides, through separate lines, an independent D.C. voltage supply (about 12 volts) to the pre-amplifiers 22.

A system calibration of the system of the invention is done in two stages or levels. In the first, after the on-board wire-harness is set up, a series of phase and amplitude measurements are made for the full range of frequencies that will be used in the spectral mode described below, normally 0.1 to 100 Hz. These results are Fourier transformed from the time domain to the frequency domain, and the transformed results are stored in the processor memory where they are deconvolved against the received signal data during actual operation. An additional second level, calibration operation is done by measuring data from the entire system (including the deployed streamer 12) in some location where the streamer 12 can be maintained stationary and where there are no IP reactive minerals or metal objects in close proximity. The final shipboard-acquired data, with the frequency-dependent system phase-shifts deconvolved therefrom in real time, is then subtracted against the second level calibration.

Turning now to the operation of the marine IP system described above, the IP system basically operates in one of two modes, a towed mode or a stationary "spectral" mode. In the towed mode, the streamer 12 is dragged by ship 10 along the sea floor, back and forth in a grid pattern in the manner of a lawn mower, so as to cover a large area. The data are acquired very rapidly at a single frequency (typically 4 Hz in the application discussed below) in a continuous sampling mode, at typical towing speeds of 3 knots or higher. A very large area can be covered in this manner in a very short time.

Before considering the spectral mode in more detail, the basic operation of the IP system which is common to both modes will be briefly considered. This basic operation, which should be evident from the discussion above, begins with the generation of a current for injection into the seawater and the sea floor sediment. The titanium-wire transmitter electrodes 18 are energized with a precisely controlled square wave voltage from current transmitter 40, resulting in the injection of several amperes of electrical current into the seawater. The cable 12 is dragged behind ship 10 and, as discussed in more detail elsewhere, is maintained in at least close proximity to the sea floor so that a significant portion of the transmitted current penetrates the sea floor sediment. As is also discussed in more detail elsewhere, metals and certain metallic-luster minerals such as ileminite ($FeTiO_3$) and pyrite (FeS) in the underlying sediments undergo a complex multi-layered reversible electrochemical adsorption of ions at the mineral-water interface under the stimulation of the transmitted signal from transmitters 18. When the square wave is turned off abruptly during the transmission duty cycle, the electrochemical reaction reverses and any subsequent secondary signal is detected using the non-polarizing Ag-AgCl receivers 20. This signal is amplified using the corresponding common-mode-rejection pre-amplifier 22 at the free end of cable 14. The signal is then sent back through cables 26 of towed cable 14 to the data acquisition and system control unit 44 where the signal is Fourier transformed and then deconvolved against a calibrate waveform to remove any extraneous effects of the ship 12 and the cables 19, 24 and 26.

After this processing, the signal provides a resistivity measurement and a chargeability measurement approximately every one second as the cable is being towed across the sea floor. The receiver dipoles, i.e., to the dipoles formed by receivers 20 and arranged in an array at increasing distances from the dipole pair of transmitters 18, provide different sensitivities to sources at different depths. Thus, the operator can, in effect, map the depth of the source anomaly in real time from the moving ship. In addition, the simultaneously acquired GPS data from input line 56 is used to provide precise horizontal locations.

After the initial survey, the ship 10 can be positioned using these GPS data to drape the streamer 14 over the source of discrete anomalies, and a series of stationary measurements can be made using a range of frequencies to obtain characteristic spectral signatures as now will be described.

In the spectral mode, the streamer 12 is positioned over an area where either a vibrocore (an electro-acoustical transmitter) has picked up heavy placer signals, or a "hit", i.e., anomalous response, has been detected while operating in the towed mode. With the streamer 12 so positioned, spectral IP measurements are carried out. More particularly, a wide range of frequencies is acquired and sampled, by data acquisition unit 44, at this single position. In this regard, as discussed elsewhere a 4-Hz square wave transmitted signal (time domain) is used to maximize the IP response from ilmenite in the towed mode. The square wave signal is necessary to optimize the efficiency of transmitter 40 (and to avoid damage thereto) and, more importantly, to provide $3^{rd}$, $5^{th}$, $7^{th}$, and $9^{th}$ harmonics of the fundamental transmitted frequency that can be used in the spectral mode. In order to acquire fifteen frequencies in the stationary mode, only square waves of 0.1 Hz, 1.0 Hz and 10.0 Hz are needed, the fundamental and the $3^{rd}$, $5^{th}$, $7^{th}$ and $9^{th}$ harmonics being collected to provide fifteen dual-component measurements. The signals are stacked-and-averaged to minimize noise, and both amplitude and phase-shift are used to generate a unique "spectral signature" in the complex plane. In other words, an Argand diagram is created wherein the amplitude of each frequency point is plotted along the X or real axis and the phase-shift of each frequency point is plotted along the Y or imaginary axis. The resulting spectral IP signatures are very distinctive and, with suitable laboratory calibration, enable characterization of the buried polarizer over which the streamer 14 passes. This means, in effect, that the buried object or mineral deposit causing the IP anomaly can be identified as in the towed mode. However, because a wide range of frequencies is being measured, the usual requirement is that the streamer 14 be held stationary in one spot for up to 15 minutes.

Where the position of interest is determined during the towed mode the required positioning of the of the ship 10 is achieved by using the GPS coordinates of the "hit" to place the ship 10 over the target. This can be accomplished by first moving the ship 10 up-current from the target, deploying the ship's anchor, then winching back out on the anchor until the ship 10 is positioned over the target. The streamer 12 is then lowered over the side and ship 10 pulls up on the anchor once more to deploy and stretch out the streamer 12 over the target (and to, of course, move the ship away from the target that is to be measured.)

Although, as discussed below, the invention is clearly not limited to the detection of these minerals, a further aspect of the invention concerns the discovery the titanium-bearing mineral ilmenite ($FeTiO_3$) and the thorium-bearing, rare-earth mineral monazite are both polarizable, i.e., responsive to IP. Ilmenite is a major source of titanium metal and titanium oxide used throughout the chemical and marine engineering industries. It has also been discovered that ilmenite has an IP reactive phase-shift maximum at 4 Hz. This frequency characteristic is critical to rapid remote mineral discrimination. It is noted that because of this frequency characteristic ilmenite is not easily detected with typical land-type IP systems since such systems are generally optimized for pyrite which has a phase-shift peak at around 0.01 Hz. The streamer system described above can be used to directly detect titanium placer concentrations less than 1% by volume so that mining companies can know where, how large, how deep, and how thick the placer deposits are. In addition to titanium and monazite, as mentioned above, refractory minerals such as zircon and staurolite, platinum group elements and gold are often found in heavy placers. Further, replacement beach sand can also be mapped. In addition, the marine IP method of the invention can be used to detect buried metallic objects and to map collections of urban wastes, which are metal-rich and anoxic, on the sea floor. It is noted with respect to the former that buried metal objects show up as a positive shift and a coincident lowered resistivity anomaly in contrast to ilmenite which shows up as an unchanged resistivity but a strong positive phase-shift.

One further specific application of the invention would be in general sea floor survey work needed for both pipeline construction and the laying of telecommunications cable. Side-scan sonar represents one major competing system for this purpose, but it is more expensive to install on a ship and requires combination with sea floor sampling devices and expensive, time-consuming follow-on laboratory work. By comparison, IP detection provides immediate results at significantly lower costs.

Another specific application of the system of the invention is in the detection of buried unexploded ordnance. Such ordnance cannot be seen by divers (and usually not even by magnetometers) operating above the sea floor but such ordnance can be mapped and characterized using the method of the invention by employing a grid or lawn mower type of survey or ship travel pattern such as described above.

In use of the streamer 12 in continuous profiling of the sea floor, it is important that this profiling be carried out with the streamer 12 directly on, and even in, the sea floor. Thus is in sharp contrast to current practice in sea-borne seismic, magnetic and resistivity profiling systems where, because of abrasion and the potential for damage from, e.g., wrecks and reefs, the systems are designed to pass through the water well above the sea floor and thus provide imaging of the sediment surfaces from a distance. Because of the high conductivity of seawater, there is tremendous electrical current channeling between transmitter electrodes and consequently little transmission of the transmitted signal into the sediments unless the electrodes are in direct contact with the sediments. Although a floating streamer is acceptable for crude resistivity profiling, the very subtle, relatively faint signals from the IP effect generally fall beneath the noise threshold unless the profiler (streamer) is in direct contact with the sea floor sediments. In an exemplary embodiment, the streamer actually trenches a path of about 5 cm. (about 2 inches) in depth into the sediments. On land, IP measurements require that the electrodes be dug or pounded into the ground and that wires be then laid out, connected and measurements made. The invention takes advantage of the fact that, at sea, the conductivity of the medium eliminates the need for implanting the electrodes and, theoretically, more IP measurements can be made in a week than have been made on land during the past 30–50 years.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A system for use in making induced polarization measurements under the sea, said system comprising:

a streamer cable having a proximal end towed from a ship in the sea, and a distal end positioned in sediments on the sea floor, said streamer cable including an active portion located at the distal end and comprising at least one transmitter for injecting a periodic electrical current into the sea floor, a plurality of receiver electrodes disposed along the towed cable in said sediments of the sea floor for receiving secondary signals produced by induced polarization of sources on or beneath the sea floor in response to said periodic electrical current, said plurality of receiver electrodes comprising at least first and second dipole groups of receiver electrodes for providing sampling at two different depths, said receiver electrodes comprising four electrodes arranged together in groups of three to form said first and second dipole groups and each of said dipole groups including an electrode shared with the other group and a central reference electrode between dipole electrodes and at least one pre-amplifier connected to each of said dipole groups for conditioning said secondary signals from the respective dipole group so as to combat noise and cross-talk effects in said secondary signals to thereby produce conditioned secondary signals; and on-board means, disposed on-board the ship, for supplying electrical current to said at least one transmitter and for receiving and processing said conditioned secondary signals from said at least one pre-amplifier.

2. A system as claimed in claim 1 wherein said on-board means includes a signal processor and wherein said pre-amplifier is connected by a grounded, shielded, coaxial line to said signal processor.

3. A system as claimed in claim 2 wherein said system includes a floating ground independent of said processor and of the ship that tows the streamer cable, and said co-axial line is connected to said floating ground.

4. A system as claimed in claim 1 wherein said at least one transmitter comprises a titanium wire electrode connected by a transmitter cable contained within said streamer cable to said on-board means.

5. A system as claimed in claim 1 wherein said at least one transmitter comprises first and second titanium wire electrodes connected by respective transmitter cables to said on-board means.

6. A system as claimed in claim 1 wherein said receiver electrodes each comprise a nonpolarizing silver-silver chloride electrode.

7. A system as claimed in claim 1 wherein said receiver electrodes are disposed in equally spaced relation along the streamer cable and provide continuously sampling at different sediment depths and said onboard means simultaneously collects data from said electrodes.

8. A system as claimed in claim 1 wherein said on-board means comprises a current transmitter circuit connected to said at least one transmitter, and a data processing unit connected to said at least one pre-amplifier for processing said conditioned signals, said processing unit being connected to said current transmitter circuit through an optical isolation amplifier to monitor the output of said current transmitter circuit for calculating values of resistivity.

9. A system as claimed in claim 1 wherein said on-board means includes a current transmitter circuit for transmitting a square-wave signal to said at least one transmitter.

10. A system as claimed in claim 9 wherein said system is adapted for use in detecting ileminite in a towed mode wherein said streamer cable is towed from the ship and said square-wave signal is transmitted at a frequency of 4 Hz.

11. A system as claimed in claim 9 wherein said system is adapted for use in a stationary mode wherein the ship is maintained at selected position and said current transmitter generates square-wave signals at different frequencies.

12. A system as claimed in claim 1 wherein said on-board means includes a data processor unit for providing continuous resistivity and phase-shift calculations based on the conditioned signals.

13. A system as claimed in claim 12 wherein said data processor unit provides said calculations on an at least one second continuous sampling basis.

14. A system as claimed in claim 1 wherein said on-board means further comprises a global positioning device for sampling location, and directional data and storing means for storing said data along with electrical data based on said secondary signals.

15. A system as claimed in claim 14 wherein said storing means comprises a laptop computer and said electrical data comprises both resistivity and induced polarization data.

16. A system as claimed in claim 1 wherein said streamer cable includes a weight for maintaining the active portion of the streamer cable in the sediments on the sea floor.

17. A system as claimed in claim 16 wherein said weight comprises a tapered lead torpedo weight.

18. A system as claimed in claim 1 further comprising a drogue rope connected to said streamer cable for stabilizing said streamer cable when being towed on the sea floor.

* * * * *